June 2, 1959 W. J. McDANELS ET AL 2,889,438
HIGH FREQUENCY INDUCTOR
Filed June 25, 1957 2 Sheets-Sheet 1

*INVENTORS*
WAYNE J. McDANELS &
TRUMAN W. CENTERS
BY
*Alfred C. Body*
ATTORNEY

United States Patent Office 2,889,438
Patented June 2, 1959

2,889,438

HIGH FREQUENCY INDUCTOR

Wayne J. McDaniels, Cleveland, and William Truman Centers, Olmsted Falls, Ohio, assignors to The Ohio Crankshaft Company, Cleveland, Ohio, a corporation of Ohio Application June 25, 1957, Serial No. 667,795

13 Claims. (Cl. 219—10.49)

This invention pertains to the art of high frequency induction heating, and more particularly to an inductor for use in such heating.

The invention is particularly applicable to high frequency inductors for heating prior to hardening of the journals or bearings of crankshafts, and will be described with particular reference thereto although it will be appreciated that the invention has broader applications.

It has been conventional for years, as is taught in U.S. Patent No. 2,170,130, owned by the assignee of this application, to surround the bearing of a crankshaft with a high frequency inductor in the form of a single turn of copper and flow electric currents through this single turn. These high frequency currents create a high frequency magnetic field which threads into the surface of the crankshaft bearing and causes high frequency currents of high intensity to flow in the surface of the bearing. These currents rapidly heat the surface to a temperature above the critical temperature of the metal. The inductor is hollow and a quenching medium is projected from the hollow through holes in the bearing facing surface onto the heated surface, thus rapidly lowering its temperature and providing a quench-hardened surface on the bearing. The inner portions of the bearing have not been heated and are unaffected by the surface hardening operation on the outer surface.

Because of the cheeks on each side of a crankshaft bearing, it has been necessary heretofore to employ what is termed a split inductor, namely an inductor which is formed in two pieces which may be separated and assembled around the crankshaft bearing. The heating and quenching operation is then carried out, and the two pieces of the inductor separated and reassembled around another bearing of the crankshaft.

One of the problems in the hardening of such bearings is the cost of manufacturing each piece of the inductor. Heretofore they have been manufactured out of solid blocks of forged copper, by machining the block to the desired size, routing out the inside of the block to make it hollow, forming a plate of the size of the opening, and brazing this plate into position. A separate inductor was required for each diameter of crankshaft bearing, and for each axial length of crankshaft bearing. If only a small number of any one size are to be hardened, the cost of the inductor per bearing hardened becomes prohibitive and unduly increases the cost.

The present invention contemplates a high frequency inductor which overcomes all of the above-referred to difficulties, and provides an inductor which may have its dimensions readily altered which is electrically efficient and simple in construction.

In accordance with the present invention, there is provided a high frequency inductor comprised of a single turn of electrically conductive material having a work piece facing surface defining a work piece receiving opening, with the inductor being constructed of a plurality of laminations of electrically conductive material, the intermediate laminations having transverse openings forming a hollow interior and the end laminations being solid to close the hollow interior. In using such a structure, an inductor block is obtained which can be axially lengthed or shortened by the addition or removal of one or more of the intermediate laminations.

Further, in accordance with the invention, the inductor includes inserts also laminated adapted to be fitted into the work receiving opening to accommodate work pieces of various sizes and shapes and cross dimensions or diameters.

Further, in accordance with the invention, the inductor may be constructed of two complementary parts which may be electrically joined together to cooperatively provide a single turn inductor having a work piece receiving opening and in which each part comprises a plurality of laminations fastened together with the intermediate laminations having transverse openings to provide a hollow interior and the end laminations being solid to close the hollow interior. Passages may be provided through the laminations from the work receiving opening to the hollow interior in each part to direct coolant fluid or media from the hollow interior to a work piece inserted in the inductor.

One of the objects of the present invention is to provide a high frequency inductor comprised of a plurality of laminations fastened together so that the inductor may be lengthened or shortened by adding or removing one or more laminations thereto or therefrom.

Another object of the invention is to provide a high frequency inductor which may be readily and economically assembled from preformed parts to accommodate any diameter or length of work piece.

Another object of the invention is to provide a high frequency inductor with a work receiving opening and inserts which may be placed in that opening to change the cross dimension, size or shape thereof, with the inserts and inductor being constructed from laminations, and with the intermediate laminations having transverse openings providing a hollow interior for the inductor and passages extending from the work receiving opening to the hollow interior to permit passage of coolant media from the hollow interior to a work piece positioned in the opening.

Another object of the invention is to provide a split single turn high frequency inductor comprised of electrically conductive laminations which is easily and economically constructed and arranged around a work piece and removed therefrom.

Other objects, and a fuller understanding of the invention, will become apparent from the following description on the specific embodiment of the invention included herein for purposes or description and not of limitation when taken in conjunction with the accompanying drawings in which.

Figure 1:
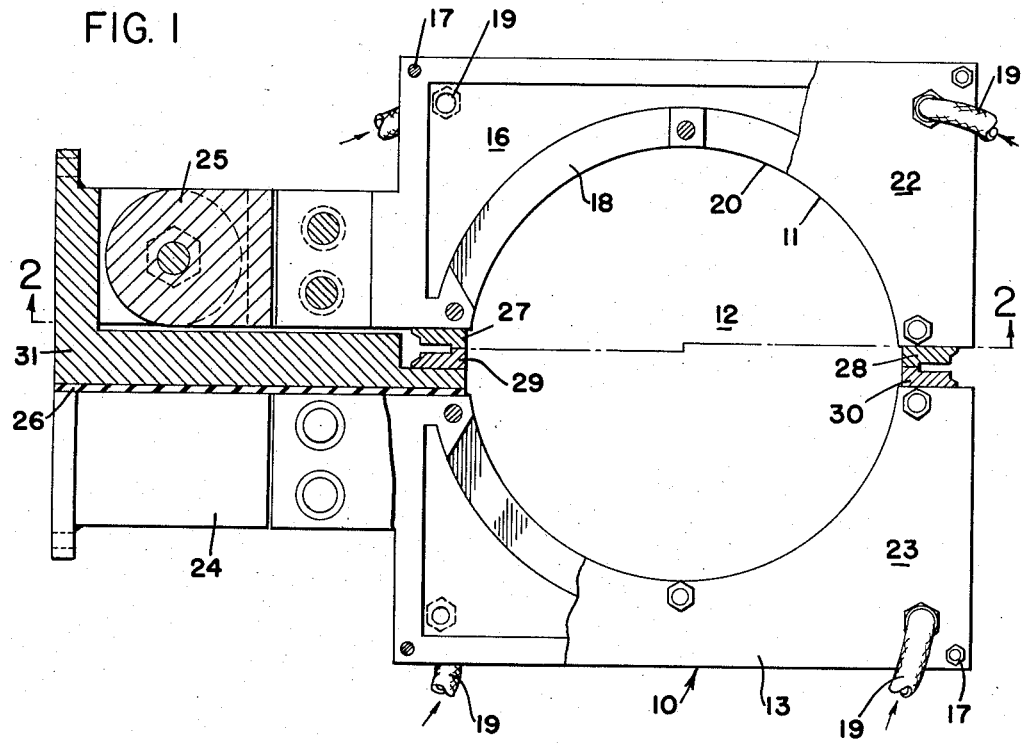
Figure 1 is a top view, partly in section, of a high frequency inductor, with the section being taken approximately along the line 1—1 of Figure 2.

Referring now to the drawings which illustrate a specific embodiment of the invention for purposes of permitting others to better understand the invention, and not for the purpose of limiting the invention, there is illustrated a high frequency inductor 10 comprised of a single turn of electrically conductive material. The inductor 10 has a work piece facing surface 11 defining a work piece receiving opening 12. As is further illustrated in Figure 2, the inductor is constructed from a plurality of laminations or relatively flat members of electrically conductive material. These laminations or flat members include intermediate laminations 13 and end laminations 14 and 15, the end lamination 14 being on one end of the inductor and the end lamination 15 being on the other end of the inductor. Each of the laminations, or at least some of the laminations, have work piece facing surfaces which form a part of the work piece facing surface 11 and therefore designated by the same reference character in the drawings.

The intermediate laminations 13 have transverse openings therein forming a hollow interior such as the hollow interior 16 and the end laminations 14 and 15 are solid to close this hollow interior. The laminations may be held in assembled relationship by any suitable means such for example welding them together, riveting them together, or fastening them together by means of bolts 17, as illustrated in the drawing. Each of the laminations may be constructed of any suitable electrically conductive material, such as for example, relatively flat members of copper or other similar metals.

The inductor 10 is further provided with a passage or passages such as the passage 18 extending through the work piece facing surface 11 and merging with the hollow interior 16. These passages 18 direct a coolant media from the hollow interior 16 onto a work piece placed in the work receiving opening 12, the coolant media having entered the hollow interior 16 through one or more suitable entrance fittings, such as the entrance fittings 19 mounted on the end laminations 14 and 15.

Figure 2:
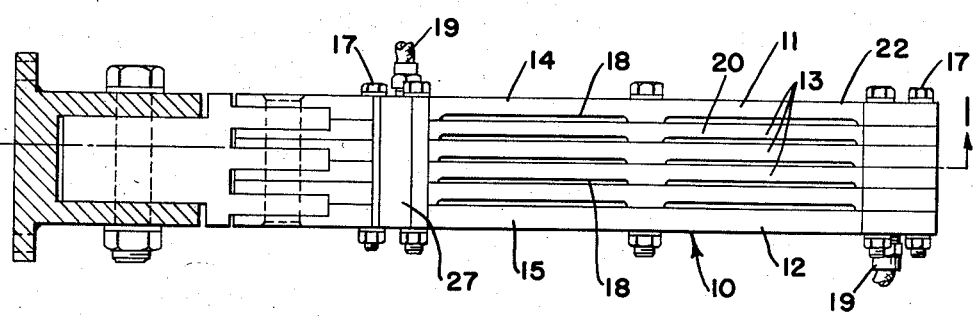
Figure 2 is a sectional view taken approximately along the line 2—2 of Figure 1.

In the specific example, illustrated in the Figures 1 and 2, the intermediate laminations 13 have work adjacent portions 20 positioned in planes transversely of the length of the inductor or the axis of the opening 12 or the work piece facing surface 11, and extending between the work piece facing surface 11 and the hollow interior 16. These work adjacent portions 20 may be provided with one or more holes or passages or recesses in one or both of the faces thereof to define the passages 18 when the intermediate laminations 13 are assembled. Similarly, the work adjacent portions 20 of the intermediate laminations may be thinner than the remainder of the laminations so that the passages 18 are formed therebetween.

As is further illustrated in the drawings, the inductor 10 may be constructed of complementary parts 22 and 23 adapted to be positioned together and electrically connected into a single turn high frequency inductor cooperatively defining the work piece facing surface 11 and the work piece receiving opening 12 when the parts 22 and 23 are assembled. In this instance the inductor part 23 is stationarily mounted by a mount 24 extending from one side thereof and the part 22 is hingedly mounted as at 25 to the stationary support 24 so that the parts 22 and 23 may be hingedly open or closed around a work piece such as a crankshaft inserted in the work piece receiving opening 12. The stationary support 24 includes insulation 26 electrically isolating the part 22 from the part 23 so that the part 22 and 23 may be connected in series electrical circuit for the flow of high frequency induction heating currents.

As is further illustrated in the drawing, each side of each part 22 and 23 is provided with contacts such as the contacts 27, 28, 29 and 30, the contacts 27 and 28 being on opposite sides of the part 22 and the contacts 29 and 30 being on opposite sides of the part 23. The contacts 27 and 29 are abuttable and the contacts 28 and 30 are abuttable when the parts 22 and 23 are positioned in operative relationship to form the work receiving opening 12. Although the contact 29 is mechanically fastened to the part 23, it is electrically insulated by means of the insulation 26 from the laminations therein and is secured to a conductor bar 31. When the conductor bar 31 and the support 24 are connected to opposite sides of a source of high frequency current, the current flows through the conductor bar 31, contact 29, contact 27, that portion of part 22 forming a part of the work piece facing surface 11, contact 28, contact 30, that portion of part 23 closest to the work piece facing surface 11 and through the stationary support 24 to the opposite side of the source of high frequency current, or vice versa.

With the parts 22 and 23 of the inductor 10 formed of intermediate and end laminations, it is readily apparent that the axial length of the inductor may be increased or decreased by adding or subtracting one or more intermediate laminations. For example, if it is desired to heat treat a work piece or crankshaft bearing, which is longer than those in a prior batch of bearings heat treated, more intermediate laminations are simply added in the inductor. Conversely, if a succeeding batch of crankshaft bearings will require a shorter inductor, several of the intermediate laminations are removed so that an inductor of the correct length of each specific crankshaft bearing is quickly, easily, and economically obtained.

Figure 3:
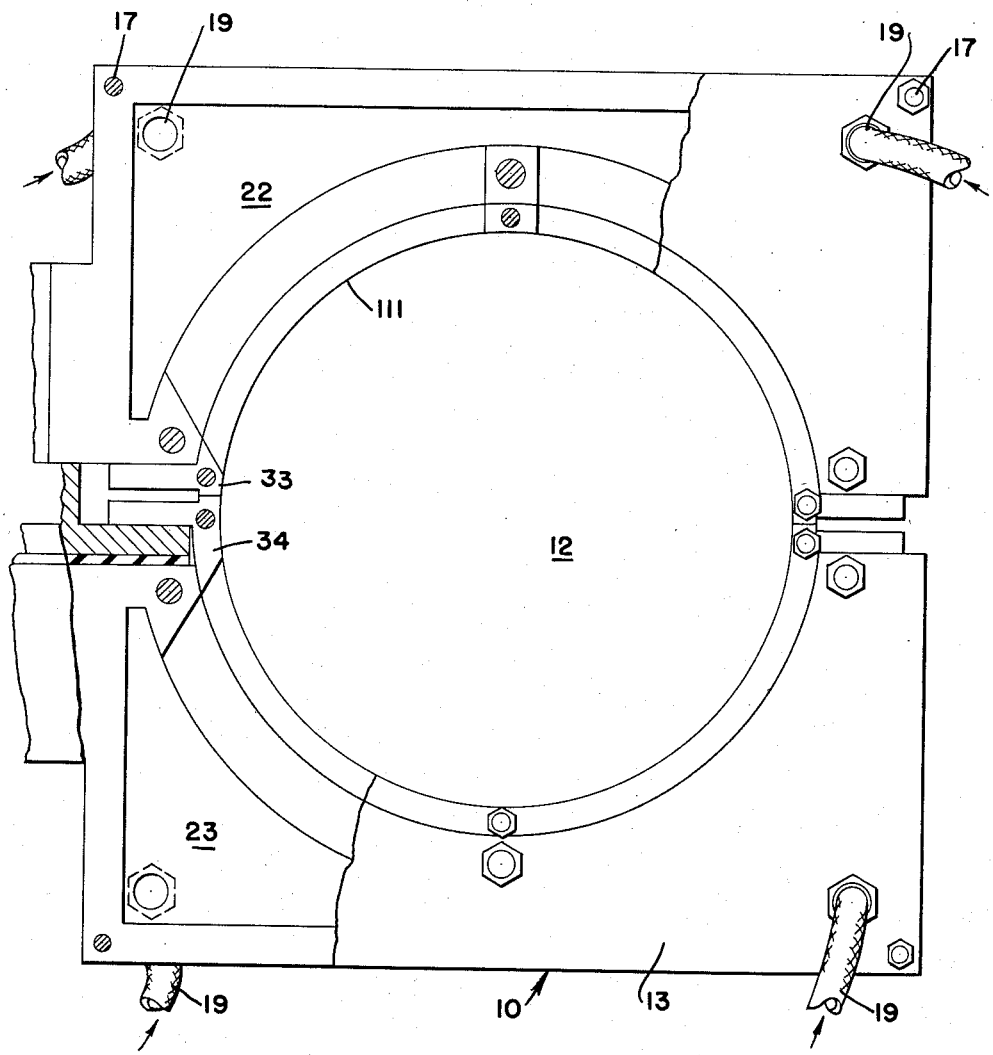
Figure 3 is a top view, partly in section, illustrating a modification of the invention.

Sometimes crankshaft bearings of different diameters, sizes, or shapes are to be heat-treated. In such cases, the present inductor may be provided with a work piece receiving opening of the correct size or shape for the various sizes or shapes of crankshaft bearings. In Figure 3 there is illustrated a modification of the inductor assembled to induction heat-treat a bearing of smaller size than that of the inductor 10, Figure 1. The inductor in Figure 3 uses the same parts 22 and 23 as the inductor 10 of Figure 1. However, in this instance, the contacts 27, 28, 29, and 30 have been removed and inserts 33 and 34 have been placed in the work receiving opening 12 to make it smaller. The insert 33 is illustrated as being fastened to the part 22 and the insert 34 is fastened to the part 23 of the inductor 10. It is preferred that these inserts 33 and 34 have outer surfaces complementary to the original work piece facing surface 11, and have a work piece facing surfacing 111 forming the desired smaller or shape of work receiving opening. Naturally, more than one set of inserts may be provided to accommodate for various sizes of crankshafts or the like, or to accommodate for the various shapes and sizes of work pieces with each complementary set of inserts having its work piece facing surface contoured to the same general shape and substantially the same dimensions as the shape and size or dimensions of the work piece to be treated.

Although various types of inserts 33 and 34 may be used, it has been found preferable to have these inserts also constructed of laminations providing recesses and/or passages complementary and co-extensive with the recesses or passages in the parts 22 and 23 so that cooling fluid or media may be readily dispersed from the hollow interior 16 onto a work piece. If desired, the opposite ends of these inserts may be provided with suitable contact shoes similar to the contacts 27, 28, 29 and 30 of Figure 1 to form a low resistance current contact therebetween when they are abutted against each other.

It is apparent from the foregoing example of a specific embodiment of the invention that the inductor illustrated provides an inductor which is constructed from laminations so that the inductor can easily be increased or decreased in length to accommodate various lengths of work pieces. It is further apparent that the inserts may be used with the inductor to provide for various shapes and cross dimensions or diameters of work pieces and that a combination of two, that is, the inserts and laminations, provide for the assembling of laminations of the inductor and the inserts in such manner that many variations of shapes and sizes of work pieces or crankshafts may be treated inexpensively. With this type of construction of an inductor, the expense and problems encountered in making prior inductors have been eliminated.

Undoubtedly other modifications and variations in details of the construction will become apparent to others on a full understanding of the invention, and it is intended that such modifications be included herein insofar as they come within the sphere and scope of the attached claims.

Having thus described my invention, I claim:

1. A high frequency inductor being comprised of a single turn of electrically conductive material having a work piece facing surface defining a work piece receiving opening, said inductor being comprised of a plurality of laminations of electrically conductive material, in side by side abutting and electrically conductive relationship each having a work piece facing surface, the intermediate laminations having transverse openings forming a hollow interior, the end laminations being solid to close said hollow interior, and means to hold said laminations in abutting relationship.

2. The inductor of claim 1 wherein said laminations have a plurality of passages extending through said work piece facing surface and merging with said hollow interior to direct cooling media from said hollow interior onto a work piece inserted in the work piece receiving opening.

3. The inductor of claim 1 wherein at least one of said laminations having means defining a passage extending through said work piece facing surface and merging with said hollow interior to direct cooling media from said hollow interior onto a work piece inserted in said work piece receiving opening.

4. The inductor of claim 1 wherein the sides of at least one of the intermediate laminations have recesses extending from the work piece facing surface to the hollow interior to define cooling media passages from the hollow interior to the work piece receiving opening.

5. A high frequency inductor being comprised of a split single turn of electrically conductive material consisting of complementary parts cooperatively having a work piece facing surface defining a work piece receiving opening, each of said parts being comprised of a plurality of laminations of electrically conductive material, in side by side abutting and electrically conductive relationship each having a work piece facing surface, the intermediate laminations of each part having transverse openings forming a hollow interior, the end laminations of each part being solid to close said hollow interior, and means to hold said laminations of each part in abutting relationship.

6. The inductor of claim 5 wherein each part of said inductor has at least a passage extending through said work piece facing surface and merging with said hollow interior to direct cooling media from said hollow interior onto a work piece inserted in the work piece receiving opening.

7. The inductor of claim 5 wherein at least one of said laminations has means defining a passage extending through said work piece facing surface and merging with said hollow interior to direct cooling media from said hollow interior onto a work piece inserted in said work piece receiving opening.

8. The inductor of claim 5 wherein the sides of at least one of the intermediate laminations have recesses extending from the work piece facing surface to the hollow interior to define cooling media passages from the hollow interior to the work piece receiving opening.

9. The structure as defined in claim 5 wherein said parts are hingedly fastened together and electrically insulated from each other on one side thereof and are abuttable against each other on the other side thereof so that the parts may be hingedly moved to or away from each other to provide a single turn inductor defining a work piece receiving opening.

10. The structure as defined in claim 1, including insert means consisting of laminations positioned co-extensively with the laminations of the inductor, the insert means being positionable in the said work piece receiving opening to define a new work piece facing surface providing a work piece receiving opening.

11. The structure of claim 5, including insert means consisting of laminations positioned co-extensively with the laminations of the inductor, the insert means being positionable in the said work piece receiving opening to define a new work piece facing surface providing a work piece receiving opening.

12. The structure as defined in claim 5, including removable laminated inserts for each part, each of said inserts having passages therethrough with the laminations and passages of the inserts alignable with the laminations and passages of the respective parts, each insert having a first surface complementary to the inner surface of the part and having a second surface to define a work piece facing surface whereby a desired set of inserts may be inserted in the said parts to accommodate a desired work piece of many sizes or shapes of work pieces to be treated.

13. The structure as defined in claim 1 including removable laminated inserts for each part, each of said inserts having passages therethrough with the laminations and passages of the inserts alignable with the laminations and passages of the respective parts, each insert having a first surface complementary to the inner surface of the part and having a second surface to define a work piece facing surface whereby a desired set of inserts may be inserted in the said parts to accommodate a desired work piece of many sizes or shapes of work pieces to be treated.

References Cited in the file of this patent

UNITED STATES PATENTS

| | | |
|---|---|---|
| 2,335,495 | Fink | Nov. 30, 1943 |
| 2,481,008 | Gagliardi et al. | Sept. 6, 1949 |
| 2,665,367 | Seulen | Jan. 5, 1954 |